(12) United States Patent
Wakuda et al.

(10) Patent No.: US 7,005,811 B2
(45) Date of Patent: Feb. 28, 2006

(54) BODILY SENSED VIBRATION GENERATOR SYSTEM

(75) Inventors: Hiroshi Wakuda, Fukushima-ken (JP); Takahiro Kawauchi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 181 days.

(21) Appl. No.: 10/717,070

(22) Filed: Nov. 19, 2003

(65) Prior Publication Data

US 2004/0104625 A1  Jun. 3, 2004

(30) Foreign Application Priority Data

Nov. 29, 2002  (JP)  ............................. 2002-348993

(51) Int. Cl.
*H02K 3/00*  (2006.01)
(52) U.S. Cl. ...................................... 318/128; 318/114
(58) Field of Classification Search ................ 318/114, 318/126, 127, 128, 129
See application file for complete search history.

(56) References Cited

U.S. PATENT DOCUMENTS 3,573,514 A * 4/1971 Race ......................... 310/17
5,682,132 A  10/1997 Hiroyoshi et al. ........ 340/407.1
2002/0030663 A1  3/2002 Tierling et al. ............. 345/156

FOREIGN PATENT DOCUMENTS

EP  1 199 111 A1  4/2002
JP  09-205763  8/1997

\* cited by examiner

*Primary Examiner*—Darren Schuberg
*Assistant Examiner*—Judson H. Jones
(74) *Attorney, Agent, or Firm*—Brinks Hofer Gilson & Lione

(57) ABSTRACT

A vibration generator system is capable of generating vibrations of a frequency that can be bodily sensed by humans, notwithstanding a small size, and making setting of a configuration of vibrations easy. When a drive signal composed of a set of an accumulation signal and a damping signal is given as a natural frequency of a movable body, a vibrational waveform of the movable body makes an envelope. Since a frequency of the envelope is in a lower frequency band than the natural frequency of the movable body, humans can surely sense vibrations. When the number of and a current quantity of excitation signals and reverse excitation signals included in the accumulation signal are changed and the number of and a current quantity of inhibition signals and reverse inhibition signals included in the damping signal are changed, the envelope can be changed in frequency and amplitude, so that it becomes possible to generate a variety of vibrations.

13 Claims, 5 Drawing Sheets

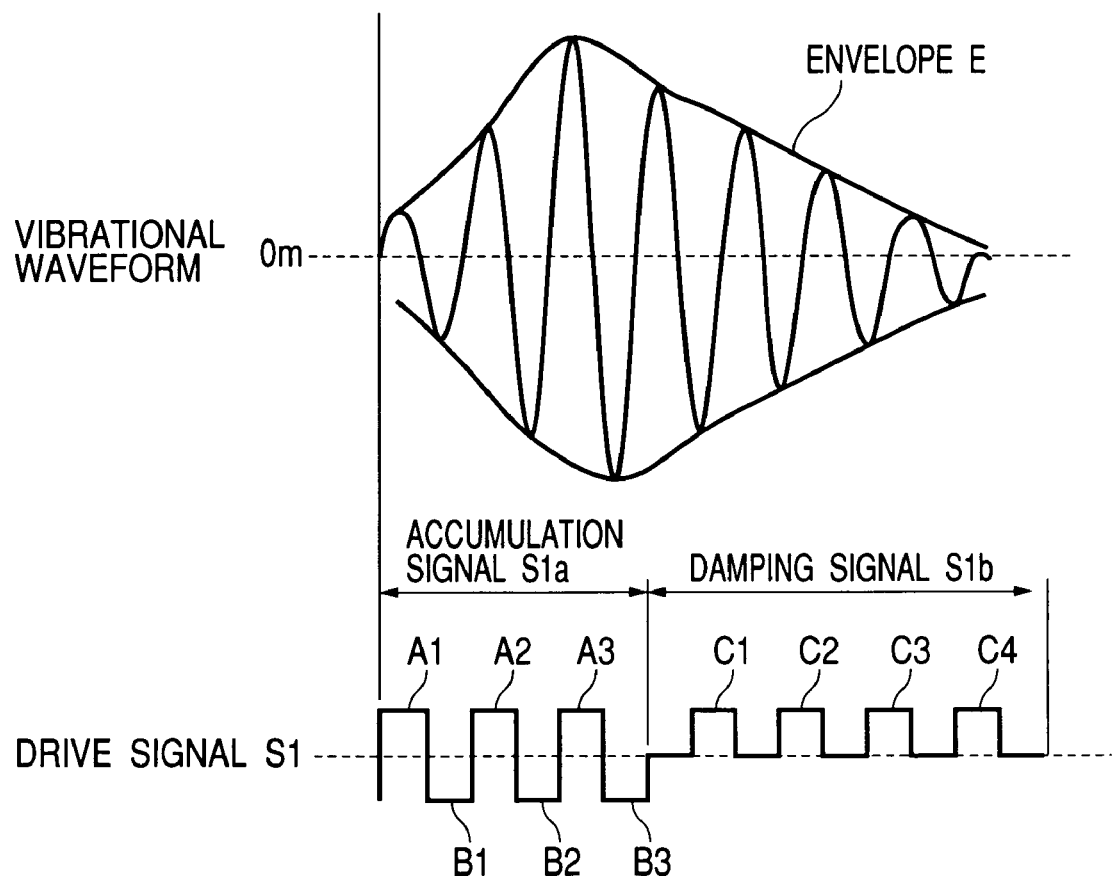

BODILY SENSED VIBRATION GENERATOR SYSTEM

This application claims the benefit of priority to Japanese Patent Application No. 2002-348993, herein incorporated by reference.

BACKGROUND OF THE INVENTION

1. Field of the Invention

The present invention relates to a bodily sensed vibration generator system mountable on small-sized information terminal devices, such as portable telephones, PDA, portable game equipments, and so on, and more particular, to a bodily sensed vibration generator system, which is small in size and capable of realizing a variety of vibrations.

2. Description of Related Art

For example, Patent document 1 discloses an invention of a conventional vibration generator system.

The vibration generator system may be used as a drive device for speakers, and in which a cylindrical-shaped coil is fixed on a side of a bottom surface of a housing and a magnetic field generator composed of a magnet and a yoke is elastically supported in a position opposed to an outer surface of the coil by a plate-shaped elastic body or a coil spring. When a drive signal is given to the coil, an electromagnetic force acts between the magnetic field generator and the coil to vibrate the magnetic field generator.

Also, a column of the prior art in Patent document 1 describes a biased weight type vibration generator system as a general vibration generator system. With the biased weight type vibration generator system, a biased weight having a non-axisymmetric shape is provided on a tip end of a rotating shaft of a motor and vibrations are generated by making a center of gravity of the biased weight offset from a center of rotation when the rotating shaft is rotated.

[Patent Document 1]

JP-A-9-205763

However, the vibration generator system described in Patent document 1 is directed to bodily sensing vibrations when the magnetic field generator generates natural vibrations. However, the number of vibrations that can be bodily sensed by humans is in a relatively low frequency band. The natural frequency of mechanical vibration is inversely proportional to the square root of a mass of a movable part and proportional to the square root of a spring constant. Accordingly, in order to generate natural vibrations at that frequency, which can be bodily sensed by humans, the movable part must have a considerably large mass since the movable part is limited in stroke. A drive part must have a large volume correspondingly, so that in order to generate natural vibrations of that amplitude, which can be bodily sensed by humans, equipments is large.

Also, while an increase in frequency of natural vibrations is conceivable for the sake of miniaturization, it is also difficult since the number of vibrations that can be bodily sensed by humans is in a relatively low frequency band.

Also, while the vibration generator system can generate simple vibrations based on the frequency of natural vibrations continuously or intermittently, it is not possible to freely set a configuration of vibrations. Accordingly, it is not possible to mount the system on portable telephones or portable game equipments to generate a variety of effective vibrations.

Meanwhile, the conventional biased weight type vibration generator system is constructed to have a motor and a biased weight and so becomes large-sized, and it becomes necessary to firmly fix the motor in a manner to withstand vibrations caused by rotation of the biased weight, so that miniaturization of the system is impeded. Also, since a large inertial force acts on the biased weight in rotation, it is hard to finely vary intensity (mode of vibration) of vibrations by giving various drive signals and modifying the rotating speed. That is, the biased weight type vibration generator system involves a problem of a poor follow-up property of the vibration system for drive signals.

SUMMARY OF THE INVENTION

Embodiments of the invention provide a vibration generator system, which can generate vibrations at a frequency that can be bodily sensed by humans, while being small in size, and which makes setting of a configuration of vibrations easy.

The invention has a feature in a vibration generator system, by which a movable body is vibrated according to a drive signal, characterized in that accumulation signals for excitation of the movable body to vibrations are included in the drive signal at intervals, and when the accumulation signals are given, the movable body perform motions to be excited, to damp thereafter, and to repeat such excitation and damping, and that changes in an envelope, which connects peaks of amplitude of the movable body when the vibrations are excited and damped, are obtained as vibrations of a lower frequency than a frequency of the vibrations.

With the vibration generator system, vibrations of the movable body themselves are not bodily sensed but changes in an envelope, which connects peaks of amplitude of the movable body, are taken out as vibrations being bodily sensed by humans. A frequency of the envelope is in a lower band than a natural frequency. The envelope is varied whereby changes in intensity of vibrations are given to humans. Since changes in intensity of vibrations are easy to be bodily sensed as changes in feeling of pressure and the frequency of the envelope is in a frequency band, which can be bodily sensed effectively, humans can surely detect vibrations. Also, in the case where the movable body is excited at the natural frequency, the natural frequency may be high and so the movable body can be decreased in mass and formed to be small-sized. Also, since a spring constant can be made large, the movable body can be controlled in amplitude by the energizing means and it becomes easy to control the envelope.

In addition, while the vibration generator system according to the invention is suited to applications, in which vibrations are generated at a natural frequency determined by a mass of the movable body and a spring constant, it is not limited to applications, in which vibrations are generated at a natural frequency, but also to applications, in which excitation is caused at a frequency close to a natural frequency.

For example, the accumulation signals include excitation signals intermittently giving to the movable body a driving force in the same direction.

Further, the accumulation signals may include reverse excitation signals provided between the excitation signals to give a driving force in a reverse direction to that of the driving force by the excitation signals.

In this manner, the excitation signals and the reverse excitation signals are given alternately whereby excitation of the movable body can be increased in rise and amplitude.

Further, the drive signal includes damping signals for damping of the movable body, which has been excited with the accumulation signals, after the excitation.

While the drive signal may include only the accumulation signals, damping signals are included to thereby enable excitation and damping to shorten cycles of the envelope and to generate pointed vibrations.

For example, the damping signals include inhibition signals giving to the vibrating movable body a driving force in a reverse direction to a move direction thereof.

Further, the damping signals preferably include reverse inhibition signals provided between the inhibition signals to give a driving force in a reverse direction to that of the driving force by the inhibition signals.

By giving the inhibition signals and the reverse inhibition signals alternately, it is possible to abruptly damp vibrations to set the envelope in a steep shape.

Also, the control means can be configured to produce intervals of the accumulation signals in different patterns and can generate accumulation signals having different numbers of the excitation signals and different patterns. Likewise, it is preferably possible to freely vary intervals of the damping signals and the number of the inhibition signals in the damping signals.

In this case, variableness may be achieved by beforehand preparing the accumulation signals and the damping signals in a plurality of patterns, or a multiplicity of patterns for combinations of the accumulation signals and the damping signals, enabling continuously varying intervals of the accumulation signals and the damping signals, and enabling continuously varying the number of the excitation signals and the inhibition signals.

Also, the invention can make a configuration in which the movable body is supported on a support to be able to reciprocate in a range of a predetermined stroke, and which comprises energizing means for energizing the movable body toward a middle point of the stroke, magnetic drive means comprising a magnet provided on one of the movable body and the support and a coil provided on the other of the movable body and the support and for giving to the movable body a driving force in a direction along the stroke, and control means for giving a drive signal to the coil to cause the movable body to generate vibrations of natural frequency.

Such configuration is not limited to one as shown in the embodiment of the figure, in which the movable body reciprocates linearly but may be one, in which the movable body reciprocates in a rotational locus.

The above configuration may be constructed such that position detection means is provided to detect that the movable body has reached a predetermined position of detection during vibration and cycles of the excitation signals are determined on the basis of detection signals from the position detection means.

Alternatively, the configuration may be constructed such that position detection means is provided to detect that the movable body has reached a predetermined position of detection during vibration and cycles of the inhibition signals are determined on the basis of detection signals from the position detection means.

The provision of such detection means makes it possible to generate excitation signals and inhibition signals following fluctuation in natural frequency of the movable body, which is caused by mechanical wear and changes in environment.

The movable body in the invention is movable along an axis, and the energizing means can be configured to comprise a coil spring for biasing the movable body in different directions from both sides in the stroke direction.

Further, preferably, the support comprises a cylindrical casing and the axis is positioned on a central axis of the cylindrical casing, and wherein one of the magnet and the coil is provided on the support and the other of the magnet and the coil is provided on the cylindrical casing.

BRIEF DESCRIPTION OF THE DRAWINGS

FIG. 6 is a view showing an example of control for a vibrational waveform of an envelope.

DESCRIPTION OF THE PREFERRED EMBODIMENTS

Figure 1A:
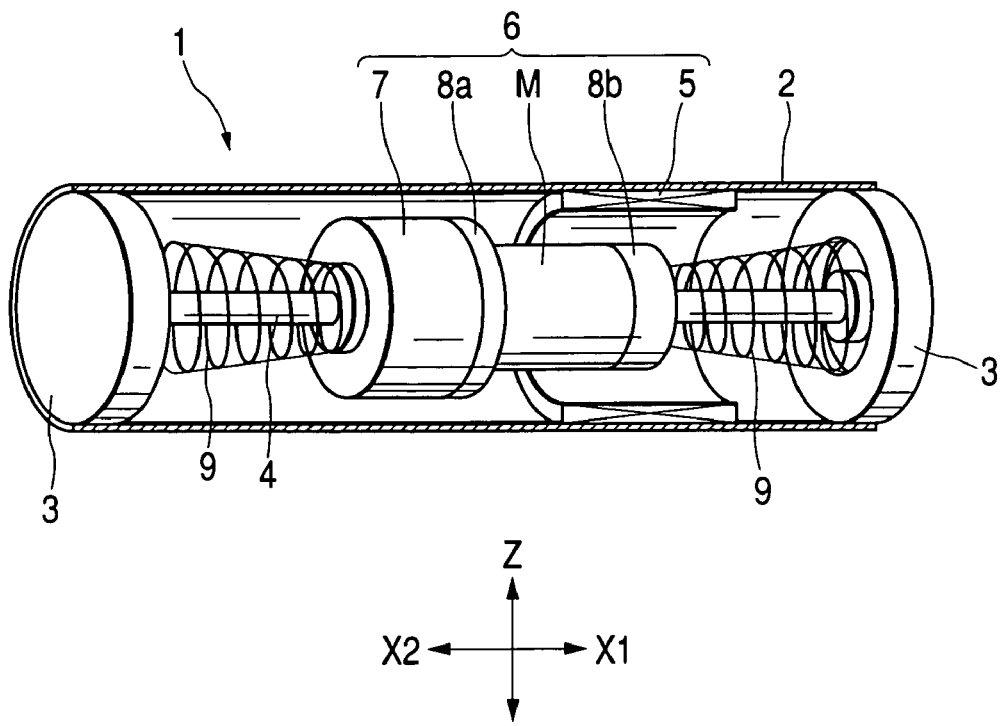
FIG. 1 shows an embodiment of vibration generating means 1A being a perspective, cross sectional view, and 1B being a cross sectional view.

FIG. 1 shows an embodiment of vibration generating means, 1A being a perspective, cross sectional view, and 1B being a cross sectional view.

Figure 3:
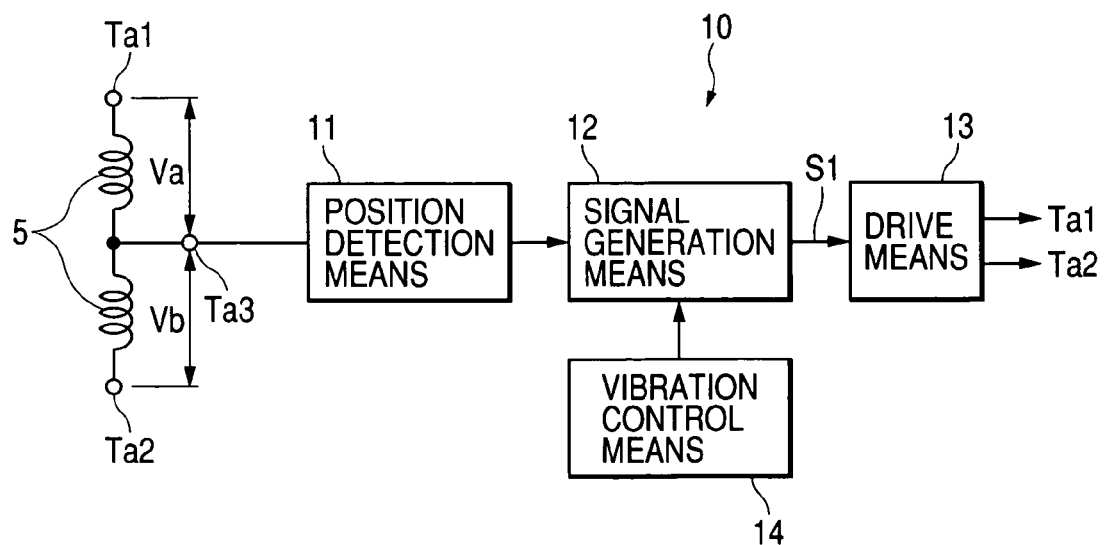
FIG. 3 is a block diagram showing control means.

A vibration generator system according to the invention comprises vibration generating means 1 shown in FIG. 1 and control means shown in FIG. 3.

The vibration generating means 1 shown in FIG. 1 comprises a cylindrical-shaped casing 2 made of a magnetic substance as a support, and covers 3, 3 made of a non-magnetic substance and being mountable on both ends of the casing. A shaft 4 made of a non-magnetic substance is supported on inner surfaces of the covers 3, 3, the shaft 4 being in agreement with an imaginary center line O—O, which extends centrally of the casing 2 and the covers 3, 3.

A coil 5 is fixed to an inner wall of the casing 2. The coil 5 is formed by winding a length of covered copper wire, such as enameled wire or the like, in a cylindrical shape, and is fixed in a position somewhat to one (a X1 side in FIG. 1) of the covers 3 from a center of a length of the casing 2 in a direction X shown.

A movable body 6 is provided inside the casing 2. The movable body 6 is provided at one end thereof (a X2 side) with a weight 7 made of a non-magnetic substance and at the other end thereof (a X1 side) with a magnet M. Also, the magnet M is provided on both end surfaces thereof with yoke members 8a, 8b, which are formed from a magnetic material. The weight 7, yoke member 8a, magnet M, and the yoke member 8b are column- or disk-shaped, and all outer peripheral surfaces thereof are positioned in circles concentric with a center of the shaft 4.

A hole 6a extending in the X direction is formed centrally of the movable body 6, that is, centrally of the weight 7, yoke member 8a, magnet M, and the yoke member 8b, and has the shaft 4 inserted inside thereof. Therefore, the movable body 6 can reciprocate along the shaft 4 in a stroke within a predetermined range in the X direction shown. Since the shaft 4 is formed from a non-magnetic material, the movable body 6 is not attracted to the shaft 4 by forces of the magnet and a moving load is small when the movable body 6 moves along the shaft 4.

Also, the magnet M and the yoke member 8b are formed to have a smaller outside diameter than those of the weight 7 and the yoke member 8a and than an inside diameter of the coil 5. Therefore, when the movable body 6 moves along the shaft 4 in the X1 direction shown, portions of the magnet M and the yoke member 8b can move within an interior of the coil 5.

In the embodiment, the magnet M and the coil 5 form a moving-magnet type magnetic drive means. However, a moving-magnet type magnetic drive means may be used, in which a coil is mounted on the movable body 6 and a magnet opposed to the coil is provided on an inner peripheral surface of the casing 2.

Energizing members 9, 9 are provided between both ends of the movable body 6 and inner surfaces of the covers 3, 3, and so oppositely directed biasing forces along an axial direction are exerted on the movable body 6 by the energizing members 9, 9. The energizing members 9, 9 preferably have the same spring constant to produce the same elastic force when they have the same axial length. FIG. 1 shows a state, in which the coil 5 is not energized, and at this time, the movable body 6 is exerted by the biasing forces of the energizing members 9, 9 positioned on both sides thereof to be positioned in a middle point of the moving stroke.

Figure 1B:
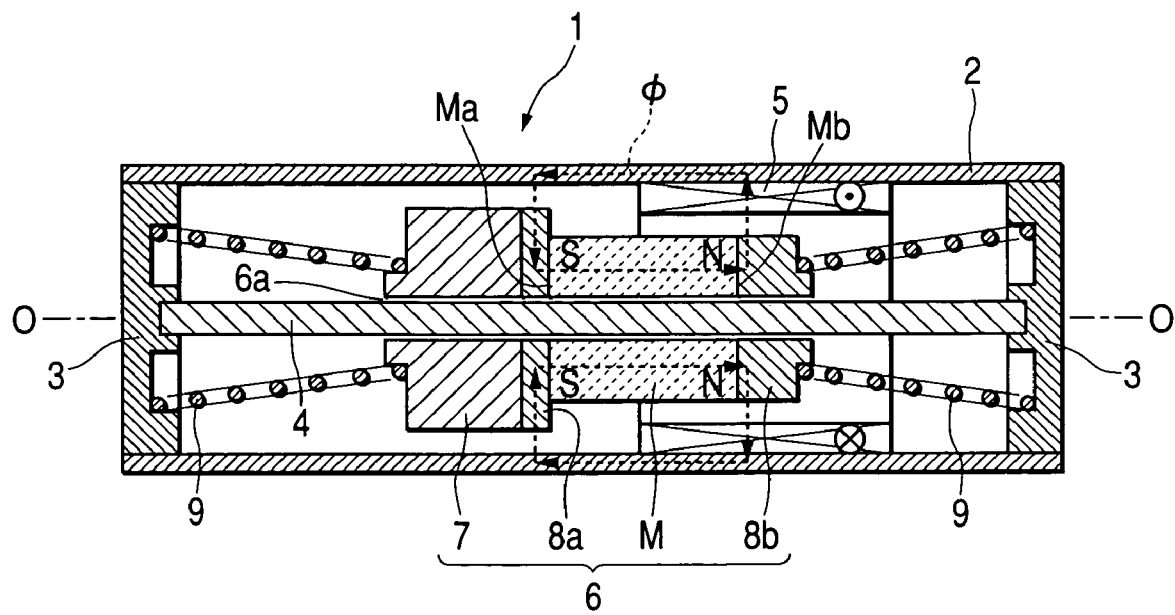

In FIG. 1B, the energizing members 9, 9 are cone coil springs. The cone coil springs have such characteristics that as they undergo compressive deformation, they are varied in spring constant. The vibration generating means 1 vibrates the movable body 6 at a natural frequency that is determined by spring constants of the respective energizing members 9, 9 in a neutral state shown in FIG. 1 and a mass of the movable body 6. However, when the cone coil springs are used, the cone coil springs disposed on both sides are varied in spring constant as the movable body 6 moves in the X1 direction or the X2 direction. Therefore, as the movable body 6 moves much from the middle point shown in FIG. 1, the natural frequency is varied. Thereby, it is possible to restrain the movable body 6 from resonating at the natural frequency and moving at a larger amplitude than a stroke, which is essentiality desired to control.

That is, the energizing members 9, 9 making use of the cone coil springs function to determine the natural frequency with their spring constants and can also display the function as dampers for suppressing movements when the movable body 6 becomes large in stroke. As energizing members, of which spring constants are varied with displacement in this manner, coil springs wound at variable pitch can be used as well as the cone coil springs. Alternatively, dampers may be separately provided inside the covers 3, 3 to restrain the movable body 6 from becoming excessive in amplitude.

The magnet M is magnetized such that an end surface Ma in contact with the yoke member 8a and an end surface Mb in contact with the yoke member 8b have opposite magnetic poles. In the embodiment shown in FIG. 1, the end surface Mb assumes the N pole and the end surface Ma assumes the S pole. In this case, magnetic flux φ generated by the magnet M are output through one of the yoke members 8b in an outer peripheral direction to traverse the coil 5 perpendicularly to reach the casing 2. Further, the magnetic flux φ form a magnetic path, along which the flux pass inside the casing 2 made of a magnetic substance to be conducted to a position opposed to the other of the yoke members 8a, and are output toward the yoke member 8a from the position to reach the S pole of the magnet M.

Also, as shown in FIG. 1, when the movable body 6 is positioned at the middle point of the moving stroke, a middle point of a widthwise dimension of one of the yoke members 8a in the X direction is in agreement with, or substantially in agreement with a middle point of the coil 5 in an axial direction of winding.

In the neutral state shown in FIG. 1, when current in a direction shown in FIG. 1B is given to the coil 5, a magnetic force F is generated by the magnetic flux φ and the current in the X2 direction to be able to give to the movable body 6 a driving force in the X2 direction. Also, a driving force in the X1 direction can be given to the movable body 6 by feeding a reverse current to the coil 5.

Subsequently, control means for the vibration generator system will be described.

Figure 2:
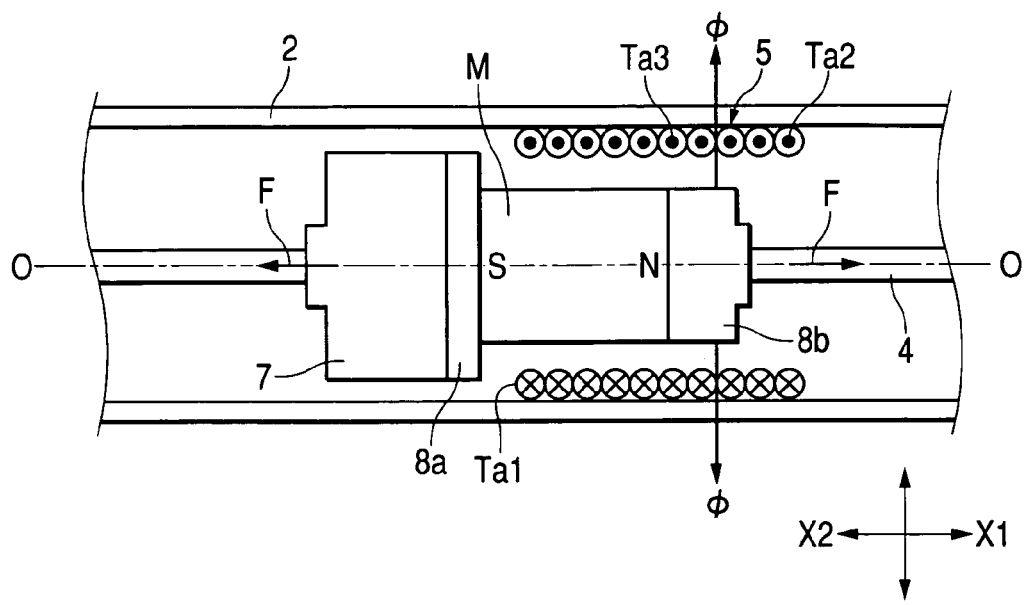
FIG. 2 is a partial, cross sectional view showing the facing relationship between a magnet and a coil.
Figure 4:
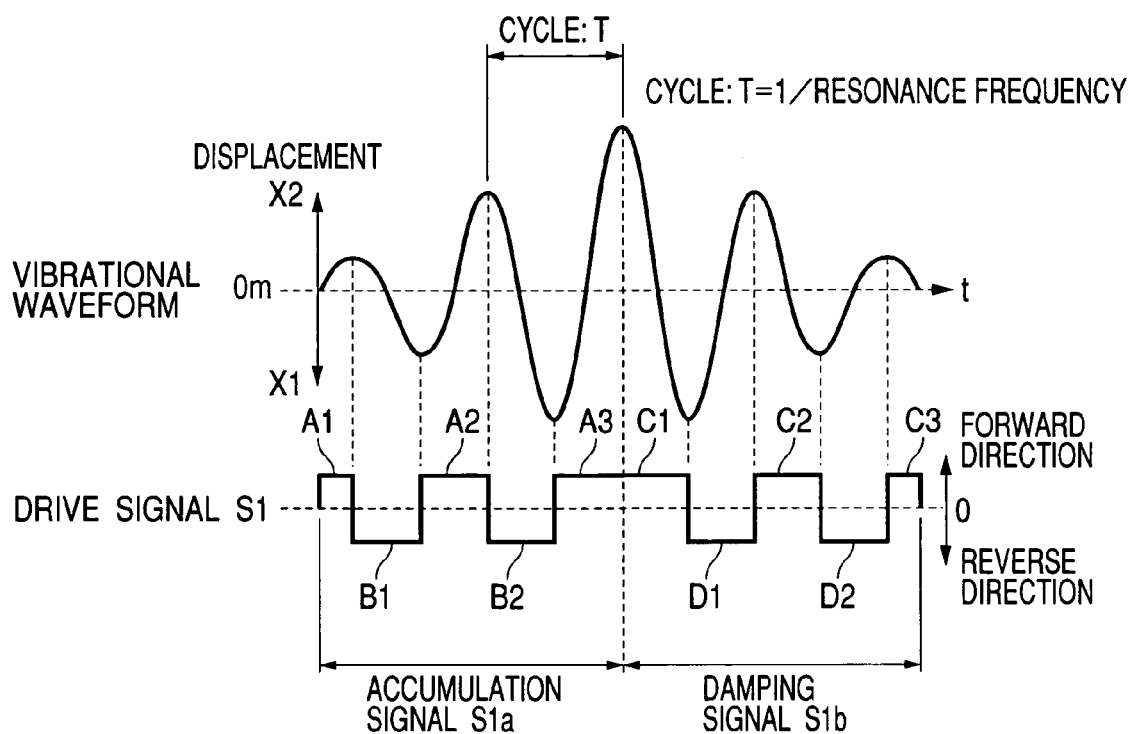
FIG. 4 shows graphs illustrating an example of a drive signal given to the coil and vibrations of a movable body at that time.

FIG. 2 is a partial, cross sectional view showing the facing relationship between the magnet and the coil, FIG. 3 is a block diagram showing the control means, and FIG. 4 are graphs illustrating an example of a drive signal given to the coil and vibrations of the movable body 6 at that time.

As shown in FIG. 2, one end (a leading end of winding) of the coil 5 makes a terminal Ta1, the other end (a trailing end of winding) makes a terminal Ta2, and a middle point (a middle point of the coil 5) between the terminal Ta1 and the terminal Ta2 makes a middle terminal Ta3.

Control means 10 shown in FIG. 3 comprises position detection means 11 connected to the middle terminal Ta3, signal generation means 12, drive means 13, and vibration control means 14. The drive means 13 is provided with two output parts, one of which is connected to one of the terminals Ta1 of the coil 5 and the other of which is connected to the other of the terminals Ta2 of the coil 5.

The signal generation means 12 generates a drive signal S1 on the basis of a command from the vibration control means 14 to output the same to the drive means 13, and a drive current having a predetermined waveform is given to the terminal Ta1 and the terminal Ta2 of the coil 5 from the drive means 13. The signal generation means 12 stores the drive signals S1 having a plurality of patterns, and a drive signal S1 having a certain pattern is selected on the basis of a command from the vibration control means 14 to be given to the drive means 13.

The position detection means 11 detects that the movable body 6 has reached the neutral position shown in FIGS. 1 and 2, that is, a middle point in the reciprocation stroke. When a detection signal of the middle point detected by the position detection means 11 is given to the signal generation means 12, the signal generation means 12 performs control, such as switching of current direction of the drive signal S1 or the like, with the detection signal as a standard.

In addition, while the position detection means 11 is not essential, the provision of the position detection means 11 makes it possible to generate a drive signal S1 following large changes in elastic forces of the energizing members 9, 9 even in the case where the movable body 6 involves a large sliding load, or the movable body 6 gets out of order much in natural frequency due to such large changes in elastic forces.

Also, a detected position in the position detection means 11 is not limited to the middle point in the reciprocation stroke, at which the movable body 6 is positioned. For example, such detected position may be positions of maximum amplitudes in the X1 and X2 directions, at which movements of the movable body 6 stop, or other predetermined detected positions.

FIG. 4 shows a waveform of a drive signal S1. In the embodiment, while the drive signal S1 is given to the coil 5 as a rectangular wave, the drive signal S1 may have a waveform such as a triangular wave or the like. In FIG. 4, a middle point of the drive signal S1 is indicated by "0", and at this time the coil 5 is in a non-energized state. When the drive signal S1 rises in a forward direction, current flows through the coil 5 from the terminals Ta1 to the terminals Ta2. At this time, a driving force acts on the movable body 6 in the X2 direction. Also, when the drive signal S1 shown in FIG. 4 is in a reverse direction, current flows through the coil 5 reversely to the above, and at this time a driving force is given to the movable body 6 in the X1 direction.

As shown in FIG. 4, an accumulation signal S1*a* is included in the drive signal S1. The accumulation signal S1*a* excites resonant vibrations at the natural frequency in the movable body 6. Excitation signals A1, A2, A3 are included in the accumulation signal S1*a*, and the excitation signals A1, A2, A3 give to the coil 5 current in a forward direction. In addition, in FIG. 4, the excitation signals A1, A2, A3 are constant in level, and intermittently give to the coil 5 a constant current quantity.

FIG. 4 shows a vibrational waveform with the axis of ordinates representing displacements of the movable body 6 in the X1 and X2 directions, as well as a waveform of a drive signal S1. Om in the vibrational waveform means that the movable body 6 is positioned at the middle point shown in FIGS. 1 and 2. In addition, the axis of abscissas indicates time t in both graphs, which show a waveform of a drive signal S1 and displacements of the movable body 6.

While the natural frequency (resonance frequency) of the movable body 6 is determined by a mass of the movable body 6 and the spring constants (spring constants in the neutral position shown in FIG. 1) of the energizing members 9, 9, the excitation signals A1, A2, A3 are given every cycle T, which is the reciprocal of the natural frequency (resonance frequency) and an energization time is a half of the cycle T. More specifically, the excitation signals A1, A2, A3 are given when the movable body 6 has a velocity in the X2 direction and the excitation signals A1, A2, A3 are given to the coil 5 whereby a driving force in the X2 direction is further given to the movable body 6 having a velocity in the X2 direction. In addition, the excitation signal A1 is a starting signal.

The excitation signals A1, A2, A3 cause the movable body 6 to begin vibrations, and vibrations at the natural frequency are increased in amplitude with time.

The accumulation signal S1*a* in the embodiment shown in FIG. 4 includes reverse excitation signals B1, B2 between adjacent excitation signals A1, A2, A3. The reverse excitation signals B1, B2 permit a reverse current to that with the excitation signal A to be given to the coil 5. The reverse excitation signals B1, B2 are given to the coil 5 when the movable body 6 has a velocity in the X1 direction, and a driving force in the X1 direction is further given to the movable body 6.

In this manner, the excitation signal A and the reverse excitation signal B are alternately given whereby amplitude of the movable body 6 is abruptly increased in a short time.

In addition, it is not necessarily required that the accumulation signal S1*a* include the excitation signal A and the reverse excitation signal B, and so vibrations can be generated in the movable body 6 and increased in amplitude only with the excitation signal A or the reverse excitation signal B. In this case, amplitude can be abruptly increased by increasing the excitation signal A or the reverse excitation signal B in current quantity.

Also, amplitude can be maintained with resonant vibrations of the movable body 6 even when the excitation signal A and the reverse excitation signal B are given only in an initial period of time during that term, in which the accumulation signal S1*a* is given, and for some time thereafter current is not given to the coil.

Here, an increase in amplitude becomes maximum when a direction of driving is the same as a move direction of the movable body 6 and frequency is in agreement with the resonance frequency.

Methods of controlling an increasing rate (decreasing rate) of amplitude include a method of varying an input energy, and a method of staggering a drive signal S1. The former method of varying an input energy includes control through amplitude variation, in which a drive current (or a drive voltage) given to the coil 5 is varied in quantity, and PWM (Pulse Width Modulation) control, in which a drive current (or a drive voltage) is varied in energization time. Also, the latter method of staggering a drive signal S1 includes one, in which phase is shifted, and one, in which frequency is shifted.

With the PWM control, time, during which, for example, the excitation signal A is given, is made shorter than time half of the cycle T and excitation is made 0 in the remaining time for the accumulation signal S1*a*, whereby control is enabled to prevent an increase in amplitude of the movable body 6 from becoming excessive.

Also, for the phase shift, signals are not varied in pulse width (time interval), and the excitation signal A is somewhat advanced or delayed relative to time as a standard, whereby control is enabled to prevent an increase in amplitude of the movable body 6 from becoming excessive.

Further, for the frequency shift, an operation, in which a drive frequency of the movable body is made twice the resonance frequency and shifted to a high frequency from a low frequency, or shifted in a reverse direction, or shifted from a staggered frequency to be made in agreement with the resonance frequency and staggered from a state of agreement, is performed, whereby control is enabled to prevent an increase in amplitude of the movable body 6 from becoming excessive. With this method, since excitation is varied in efficiency and staggered in phase, it is possible to provide an excitation interval and an inhibition interval.

The drive signal S1 includes a damping signal S1*b*. The damping signal S1*b* includes inhibition signals C1, C2, C3. The inhibition signals C1, C2, C3 are staggered 180° in cycle relative to the excitation signals A1, A2, A3, and when the movable body 6 has a velocity in the X1 direction, current in a forward direction is given to the coil 5 to give a driving force to the movable body 6 in the reverse X2 direction to a direction of the velocity. Thereby, vibrations of the movable body 6 at the natural frequency are damped.

In the embodiment shown in FIG. 4, reverse inhibition signals D1, D2 are provided between the inhibition signals C1, C2, C3 to give to the coil 5 current in a reverse direction. The movable body 6 having a velocity in the X2 direction is given a driving force in the X1 direction, which cancels the velocity, by the reverse inhibition signals D1, D2. The inhibition signals C and the reverse inhibition signals D are alternately provided whereby the movable body 6 is abruptly damped in amplitude.

In addition, only one of the inhibition signals C and the reverse inhibition signals D may be provided in the damping signal S1*b*. Also, the inhibition signals C and the reverse inhibition signals D may be provided only in the first half of the damping signal and may be gradually staggered in cycle.

Figure 5:
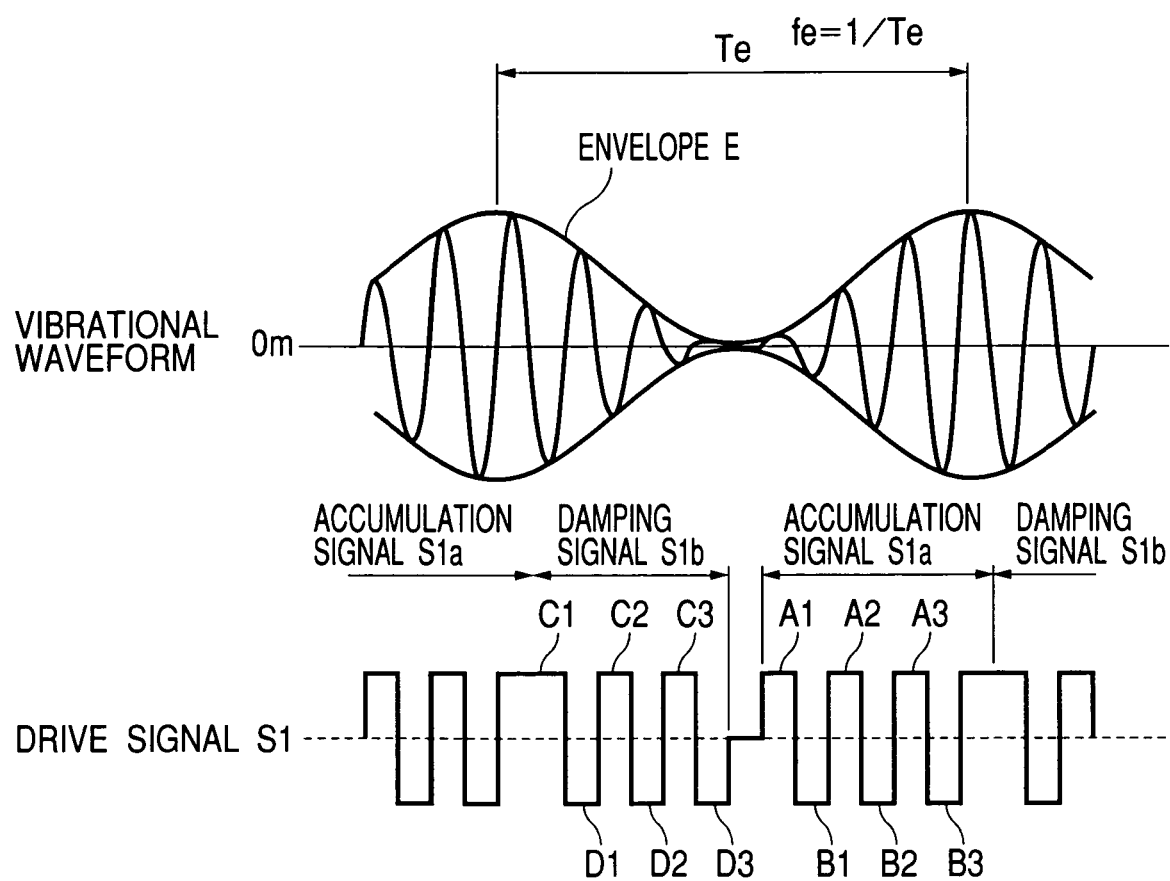
FIG. 5 is a view showing the relationship between a signal composed of a set of an accumulation signal and an damping signal, and a vibrational waveform of the movable body.

FIG. 5 shows a vibrational waveform of the movable body 6 in the case where the accumulation signal S1*a* and the damping signal S1*b* are made consecutive and signals composed of a set of the accumulation signal S1*a* and the damping signal S1*b* are given at a cycle Te. In FIG. 5, the number of the excitation signals A1, A2, A3 in the accumulation signal S1a is the same as that of the inhibition signals C1, C2, C3 in the damping signal S1b, and the same current quantity is given to the coil 5 with the excitation signals A1, A2, A3 and the inhibition signals C1, C2, C3. Also, the number of the reverse excitation signals B1, B2, B3 is the same as that of the reverse inhibition signals D1, D2, D3, and the same current quantity is given to the coil with the reverse excitation signals and the reverse inhibition signals. Also, the accumulation signal S1a and the damping signal S1b have the same time length.

In FIG. 5, the movable body 6 vibrates at the natural frequency (resonance frequency), its amplitude increasing with time for the accumulation signal S1a, and damping with time for the damping signal S1b. In FIG. 5, a line connecting peaks of amplitude of the movable body 6 together is shown as an envelope E, the envelope E increasing or decreasing according to the cycle Te of the accumulation signal S1a and the damping signal S1b, and a frequency fe of the envelope E corresponding to 1/Te.

The movable body 6 has a small mass and so is high in natural frequency (resonance frequency). However, the frequency fe of the envelope E can be set to be lower than the resonance frequency, and vibrations can be changed in magnitude. Changes in intensity of vibrations have a feature in that they can be bodily sensed as changes in feeling of pressure (sense of pain). Also, since the frequency fe of the envelope E is in that frequency band, in which humans can sense increase and decrease in the frequency fe even when amplitude is maintained constant in magnitude, humans can bodily sense increase and decrease in the frequency fe as changes in vibrations effectively.

When vibrations having the envelope E shown in FIG. 5 are generated by the use of the small-sized vibration generating means 1 including the movable body 6 having a small mass and being high in natural frequency and the frequency of the envelope E is set at a value that can be bodily sensed by humans, humans can sense the waveform of the envelope E as vibrations.

Also, the envelope E that can be bodily sensed by humans can be freely changed in frequency and cycle by changing a repeating cycle period of a set of the accumulation signal S1a and the damping signal S1b in the drive signal S1. Also, the envelope E can be changed in amplitude by changing the number of and a current quantity of the excitation signal A and the reverse excitation signal B and changing the number of and a current quantity of the inhibition signals C and the reverse inhibition signals D.

Also, it is possible to control the envelope E in waveform. FIG. 6 shows an example of such control.

In a drive example shown in FIG. 6, an accumulation signal S1a includes excitation signals A and reverse excitation signals B alternately while a damping signal S1b includes only inhibition signals C but does not include any reverse inhibition signals D. In this case, the envelope E is shaped to abruptly rise and gently converge.

In addition to this example, an envelope E can be controlled in waveform by changing contents of an accumulation signal S1a and a damping signal S1b. In this manner, by changing a waveform of an envelope E, it is possible to optionally generate vibrations sensitively sensed by humans and vibrations dully and heavily sensed by humans.

In addition, referring to FIG. 2, when a center of the yoke member 8b in a widthwise direction moves between the terminal Ta1 and the middle terminal Ta3 in the X1 direction, a position, in which a line of magnetic force generated from the yoke member 8b intersects the coil 5, will move, so that a counterelectromotive force (voltage) Va is induced between the terminal Ta1 and the middle terminal Ta3. Also, when the center of the yoke member 8b in the widthwise direction moves between the middle terminal Ta3 and the terminal Ta2 in the X1 direction, a counterelectromotive force (voltage) Vb is induced between the terminal Ta2 and the middle terminal Ta3. Also, when moving also in the X1 direction, the counterelectromotive force Va and the counterelectromotive force Vb between the respective terminals equal to each other when a line of magnetic force generated from the yoke member 8b comes in agreement with the middle terminal Ta3. Also, in the case where a move direction of the movable body 6 is changed to the X2 direction, poles of the counterelectromotive forces Va, Vb induced in the coil 5 are made reverse to those at the time of movement in the X1 direction.

Since a line of magnetic force generated from the yoke member 8b does not vary with time in positions of maximum amplitudes in the X1 and X2 directions, at which movements of the movable body 6 stop, the counterelectromotive forces become 0.

Therefore, the position detection means 11 detects a temporal timing of switchover between the counterelectromotive forces Va, Vb whereby it is possible to detect a point of time, at which the center of the yoke member 8b in the widthwise direction is in agreement with the middle terminal Ta3, and positions of maximum amplitudes. And by using the point of time of detection to set timings, at which excitation signals A, reverse excitation signals B, inhibition signals C, and reverse inhibition signals D are to be generated, it becomes possible to generate a drive signal S1 tracking the resonance frequency of the movable body 6.

As described above, according to the invention, since an envelope for a lower frequency than the natural frequency of the movable body 6 is produced and a waveform of the envelope is bodily sensed by humans as vibrations, vibrations bodily sensed by humans can be generated also by using a small-sized vibration generating device, which is high in natural frequency. Also, by changing the envelope, it is possible to freely set the frequency of vibrations bodily sensed by humans and a manner, in which vibrations are sensed.

What is claimed is:

1. A vibration generator system for vibrating a movable body according to a drive signal, wherein accumulation signals for excitation of the movable body to vibrations are included in the drive signal at intervals, and when the accumulation signals are given, the movable body perform motions to be excited, to damp thereafter, and to repeat such excitation and damping, and that changes in an envelope, which connects peaks of amplitude of the movable body when the vibrations are excited and damped, are obtained as vibrations of a lower frequency than a frequency of the vibrations, wherein the accumulation signals include excitation signals intermittently giving to the movable body a driving force in the same direction as the motions to be excited.

2. The vibration generator system according to claim 1, wherein the accumulation signals include reverse excitation signals provided between the excitation signals to give a driving force in a reverse direction to that of the driving force by the excitation signals.

3. The vibration generator system according to claim 1, wherein the drive signal includes damping signals for damping of the movable body, which has been excited with the accumulation signals, after the excitation.

4. The vibration generator system according to claim 3, wherein the damping signals include inhibition signals giving to the vibrating movable body a driving force in a reverse direction to a move direction of the movable body.

5. The vibration generator system according to claim 4, wherein the damping signals include reverse inhibition signals provided between the inhibition signals to give a driving force in a reverse direction to that of the driving force by the inhibition signals.

6. The vibration generator system according to claim 1, wherein control means can produce intervals of the accumulation signals in different patterns and can generate accumulation signals having different numbers of the excitation signals and different patterns.

7. The vibration generator system according to claim 1, wherein position detection means is provided to detect that the movable body has reached a predetermined position of detection during vibration and cycles of the excitation signals are determined on the basis of detection signals from the position detection means.

8. The vibration generator system according to claim 4, wherein position detection means is provided to detect that the movable body has reached a predetermined position of detection during vibration and cycles of the inhibition signals are determined on the basis of detection signals from the position detection means.

9. The vibration generator system according to claim 1, wherein the movable body is supported on a support to be able to reciprocate in a range of a predetermined stroke, and further comprising energizing means for energizing the movable body toward a middle point of the stroke, magnetic drive means comprising a magnet provided on one of the movable body and the support and a coil provided on the other of the movable body and the support and for giving to the movable body a driving force in a direction along the stroke, and control means for giving a drive signal to the coil to cause the movable body to generate vibrations of natural frequency.

10. The vibration generator system according to claim 9, wherein the movable body is movable along an axis, and the energizing means comprises a coil spring for biasing the movable body in different directions from both sides in the stroke direction.

11. The vibration generator system according to claim 9, wherein the support comprises a cylindrical casing and the axis is positioned on a central axis of the cylindrical casing, and wherein one of the magnet and the coil is provided on the support and the other of the magnet and the coil is provided on the cylindrical casing.

12. A vibration generator system for vibrating a movable body according to a drive signal,
wherein accumulation signals for excitation of the movable body to vibrations are included in the drive signal at intervals, and when the accumulation signals are given, the movable body perform motions to be excited, to damp thereafter, and to repeat such excitation and damping, and that changes in an envelope, which connects peaks of amplitude of the movable body when the vibrations are excited and damped, are obtained as vibrations of a lower frequency than a frequency of the vibrations,
wherein the drive signal includes damping signals for damping of the movable body, which has been excited with the accumulation signals, after the excitation,
wherein the damping signals include inhibition signals giving to the vibrating movable body a driving force in a reverse direction to a move direction of the movable body, and
wherein the damping signals include reverse inhibition signals provided between the inhibition signals to give a driving force in a reverse direction to that of the driving force by the inhibition signals.

13. The vibration generator system according to claim 12, wherein position detection means is provided to detect that the movable body has reached a predetermined position of detection during vibration and cycles of the inhibition signals are determined on the basis of detection signals from the position detection means.

* * * * *